Jan. 8, 1935.  J. M. MAJEWSKI, JR  1,987,302
COMBINED FRUIT PRESS AND ICE CRUSHER
Filed Oct. 19, 1933
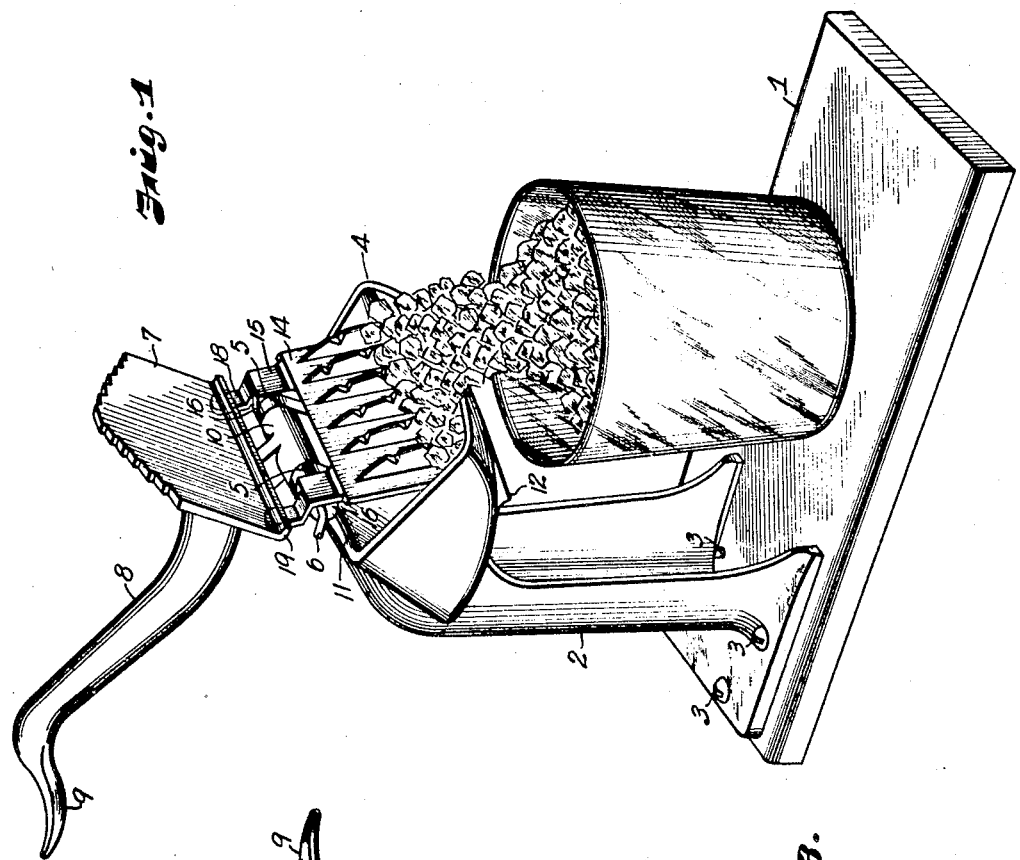
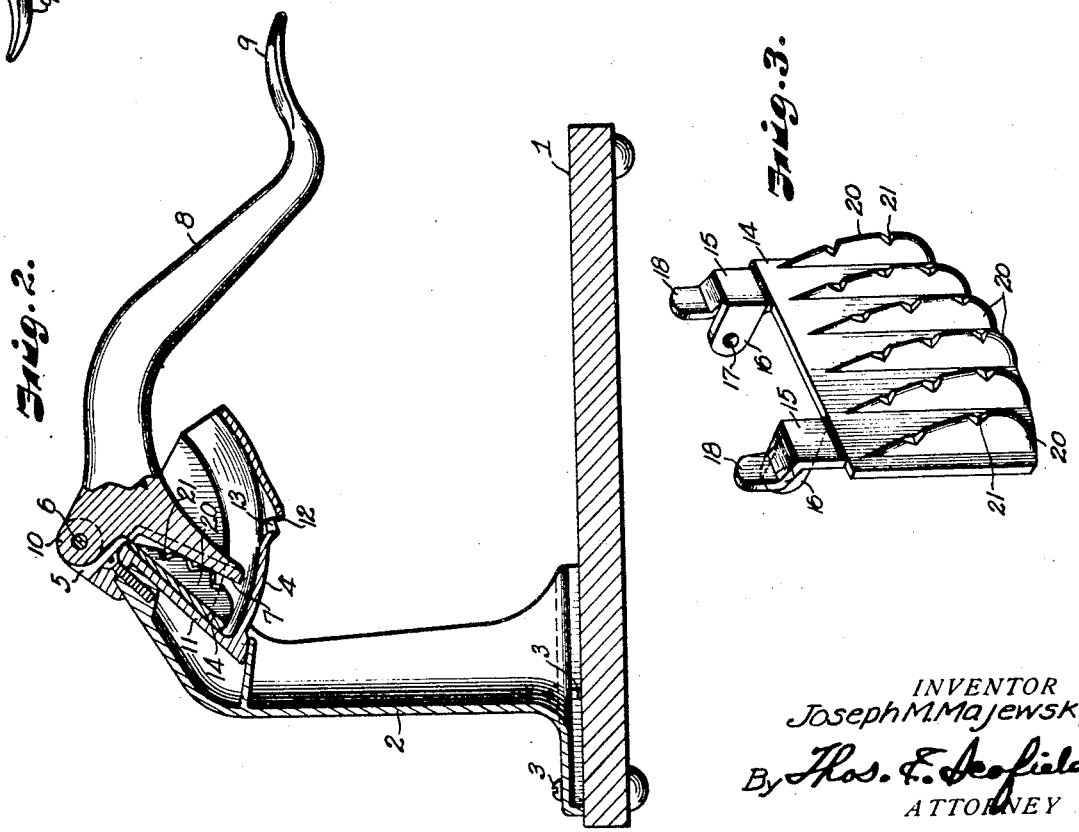
INVENTOR
Joseph M. Majewski, Jr.
By Thos. E. Scofield
ATTORNEY Patented Jan. 8, 1935

1,987,302

UNITED STATES PATENT OFFICE 1,987,302

COMBINED FRUIT PRESS AND ICE CRUSHER

Joseph M. Majewski, Jr., Kansas City, Mo., assignor to Foster L. Talge, operating as Rival Manufacturing Company, Kansas City, Mo.

Application October 19, 1933, Serial No. 694,245

2 Claims. (Cl. 83—63)

My invention relates to a combined fruit press and ice crusher.

In making certain drinks it is desirable to have finely crushed ice. Frequently fruit juices are also used in making punches, juleps, high balls, and the like.

One object of my invention is to provide a device which will enable fruit juices to be extracted in an expeditious manner.

Another object of my invention is to provide an attachment or member adapted to coact with the fruit press, which will enable it to crush ice.

Another object of my invention is to provide a device which will enable ice to be crushed and ejected expeditiously after being crushed.

In the accompanying drawing which forms part of the instant specification and is to be read in conjunction therewith and in which like reference numerals are used to indicate like parts in the various views:

Figure 1 is a perspective view of my device.

Figure 2 is a sectional elevation of the device shown in Figure 1.

Figure 3 is a perspective view of the combined crusher and ejector plate.

In general, my invention contemplates the provision of a bowl in which fruit is adapted to be placed. A pivoted presser plate is adapted to press the fruit against one side of the bowl. A drain opening provided with a suitable strainer is fitted at the bottom of the bowl. The presser plate is hinged to the bowl by means of a removable hinge pin. A plate having ridges is adapted to be hinged on the hinge pin so that ice will be crushed between the crusher plate and the presser plate. The crusher plate is provided with a pair of lugs which are adapted to be engaged by the presser plate to pivot it about the hinge pin. The pivotal motion of the crusher plate ejects the crushed ice.

More particularly referring now to the drawing, on any suitable platform such as board 1, I mount a pedestal 2 which is secured to the board by means of screws 3 or in any other suitable manner. A bowl 4 is provided with a pair of integral lugs 5 adjacent one edge thereof. The lugs are bored for the reception of a hinge pin 6. A presser plate 7 provided with a lever 8 terminating in a handle 9, is provided with an ear 10 adapted to fit between the lugs 5. The ear 10 is provided with a bore so that the hinge pin 6 may pivot the presser plate to the bowl between the lugs as can readily be seen by reference to Figure 1.

When the device is used as a fruit juicer, a piece of fruit such as an orange, for example, is cut in two and placed with the cut surface downwardly so that it rests in the bottom of the bowl 4. The lever 8 is then operated by means of handle 9 to pivot the presser plate 7 against the flat side 11 of the bowl 4 so that the fruit is squeezed between the side 11 and the presser plate. The juice extracted runs downwardly to drain opening 12 which is fitted with projecting teeth 13 which act as a strainer. The juice is collected in a receptacle placed under the opening 12.

By removing the hinge pin 6, the crusher plate 14 may be assembled as shown in Figure 1. The crusher plate has a pair of extensions 15 provided with ears 16 which have holes 17 through which the hinge pin 6 may pass. The space between the extensions 15 is such that the ears 16 will abut against the outside portions of the lugs 5. The extensions 15 are provided with projections 18 adapted to coact with the rear edge 19 of the presser plate 7. The face of the crusher plate 14 is provided with a plurality of ridges 20 which may be notched at 21 to provide an ice crushing surface.

When the device is to be used as an ice crusher, the crusher plate is fitted and ice is deposited in the bowl. The lever 8 is then operated to bring the inside surface of the presser plate 7 against the ice. Pressure is applied and the ice is crushed and comminuted against the crushing ridges 20. Upon raising the lever 8, the rear edge 19 of the presser plate 7 will abut the projections 18 as shown in Figure 1. Upward movement of the lever rotating the plate about pivot pin 6 will rotate the crusher plate 14, ejecting the crushed ice into a suitable receptacle as shown in Figure 1.

It is believed the operation of my device will be clear from the foregoing description.

Having thus described my invention, what I claim is:

1. In a fruit press having a bowl provided with a smooth bearing surface, a presser member pivoted adjacent said bowl for pivotal movement therein whereby said member is adapted to press fruit against said surface, an ice crushing plate having a bearing surface substantially conforming with said bowl bearing surface throughout its area, said ice crushing plate being provided with ice crushing projections distributed over one side, and means to removably pivot said ice crushing means about an axis adjacent the axis of the presser member, the construction being such that fruit may be pressed between said presser member and said bowl bearing surface and ice may be crushed between said crushing plate and said presser member.

2. In a fruit press having a bowl provided with a smooth bearing surface, a presser member pivoted adjacent said bowl for pivotal movement therein whereby said member is adapted to press fruit against said surface, an ice crushing plate having a bearing surface substantially conforming with said bowl bearing surface throughout its area, said ice crushing plate being provided with ice crushing projections distributed over one side, said ice crushing plate being provided with lugs, and means to removably pivot said ice crushing means about an axis adjacent the axis of the presser member, the construction being such that fruit may be pressed between said presser member and said bowl bearing surface and ice may be crushed between said crushing plate and said presser member, said presser member being adapted to engage said lugs to pivot said ice crusher plate to eject said crushed ice.

JOSEPH M. MAJEWSKI, Jr.